Sept. 26, 1967  R. H. STEVENS  3,344,347
METHOD AND APPARATUS FOR DETERMINING DISPLACEMENT
UTILIZING A HALL PLATE POSITIONED TANGENTIAL
TO AN ARCUATE MAGNETIC FIELD
Filed Aug. 23, 1963  2 Sheets-Sheet 1

INVENTOR.
RAYMOND H. STEVENS
BY MAHONEY, MILLER & RAMBO
BY Wm. V. Miller
ATTORNEYS

United States Patent Office 3,344,347
Patented Sept. 26, 1967

1

3,344,347
METHOD AND APPARATUS FOR DETERMINING DISPLACEMENT UTILIZING A HALL PLATE POSITIONED TANGENTIAL TO AN ARCUATE MAGNETIC FIELD
Raymond H. Stevens, Columbus, Ohio, assignor to F. W. Bell, Inc., Columbus, Ohio, a corporation of Ohio
Filed Aug. 23, 1963, Ser. No. 304,040
4 Claims. (Cl. 324—45)

This invention relates to a magnetic field detection apparatus for determining the location of an electric current carrying conductor and to a method of determining the location of an electric current carrying conductor by means of a Hall effect device.

This invention is primarily adapted to locating an elongated electrical conductor which may be embedded or otherwise disposed in an opaque substance or structure but which requires accurate relative placement for optimum operation. An example of such a requirement is in the manufacture of flexible tapes or cables formed from suitable insulating or dielectric materials having a plurality of embedded electrical conductors where it is necessary to maintain an accurate relative positioning of the several conductors or to maintain one or more of the conductors in precise relative position to the insulating material. Another example is the sheathed type resistance heating element of well known construction where failure to maintain the concentricity of the resistance element to the sheath will result in localized hot spots when placed in operation and subsequent failure. Optimum performance is attained with accurately positioned conductors and this necessitates an advantageous means of inspecting the finished product. In accordance with prior practice such means has included optical apparatus where the insulating or dielectric material is transparent or translucent and X-ray techniques where the conductor covering is substantially opaque. Although useful and accurate, such prior devices or techniques have not been readily adaptable to automation of manufacturing processes where it is necessary to continuously feed back control information to the apparatus to assure production or processing of a quality product.

It is, therefore, the primary object of this invention to provide a magnetic field detection apparatus and system for determining the location of a magnetic field producing device relative to a fixed reference point.

It is another object of this invention to provide an apparatus and system for determining the displacement of an electric current carrying conductor relative to a fixed reference point through displacement of the associated magnetic field by means of a Hall effect device electromagnetically coupled with the magnetic field.

It is a further object of this invention to provide an apparatus and system for determining the displacement of an electric current carrying conductor relative to a fixed reference point through displacement of the associated magnetic field by means of a Hall effect device electromagnetically coupled with the magnetic field which produces a Hall voltage proportional to the magnetic field and synchronously detecting the Hall voltage to eliminate extraneous Hall voltages.

It is also an object of this invention to provide a method of ascertaining the displacement of a magnetic field producing device relative to a fixed reference point by positioning a Hall effect device in electromagnetically coupled relationship to the magnetic field thereby producing a voltage in the Hall effect device proportional to the magnetic field and its displacement relative to the reference point.

These and other objects and advantages of this invention will be readily apparent from the following detailed description of an embodiment thereof and the accompanying drawings.

Figure 1:
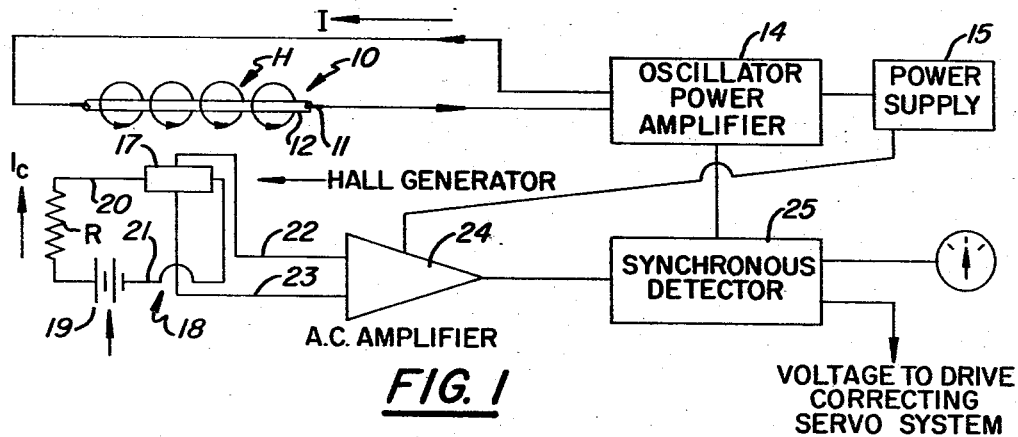
FIGURE 1 is a diagrammatic view of a conductor locating system and apparatus embodying the invention.

Referring to the drawings, FIG. 1 diagrammatically illustrates a conductor locating apparatus embodying the invention. The apparatus as shown is adapted for incorporation in a continuous manufacturing or processing system to monitor the finished product and thereby drive a servo-system arranged to automatically correct the process accordingly. The process depicted for illustrative purposes is the manufacture of an electrical cable 10 having a current carrying conductor 11 surrounded by a protective sheath or covering 12 of a suitable insulating or dielectric material. The dielectric material possesses non-magnetic characteristics to permit formation of a magnetic field concentrically with the conductor. Only a short section of the cable 10 is illustrated in FIGURE 1 but it is to be understood that the cable would be continuously produced and merely passed through a test area or stand where the apparatus of this invention would be located and may then be wound on a reel structure (not shown). Cable guide means (see FIG. 3) are provided to maintain the cable in a predetermined position for relative positioning the Hall generator. In this instance, the cable guide means comprises four grooved rollers or sheaves 13 arranged in pairs. The pairs of guide rollers 13 are positioned on opposite sides of the test area or stand to maintain the cable 10 in a fixed position as it passes through the area. The section of cable 10 thus supported between the pairs of rollers would be maintained in a fixed position relative to a fixed reference point but the conductor could be displaced relative to this reference point depending on the concentricity of the conductor 11 and its insulating covering.

The conductor 11 is connected to the output of an oscillator and power amplifier 14 to cause an alternating electric current of the desired frequency to flow through the conductor. A power supply 15 is also provided for operating the oscillator-power amplifier 14. The frequency of the oscillator 14 is preferably different from the power supply 15 (the usual 60 cycles) and any of its harmonics and is also different from the frequency of any other local oscillator that may have an effect on the test portions of the cable. The actual structure of the conductor contacts 16 has not been illustrated, the contacts being merely diagrammatically illustrated as of the spring finger type for purposes of explanation, as the method and apparatus of making contact to a continuously moving conductor is well known in the art. One contact 16 could be attached to the conductor 11 at the finished end of the cable which may be wound on a reel structure (not shown) placed in close proximity to the test area while the other contact could make a sliding contact with the conductor before the insulating covering 12 is applied.

Figure 4:
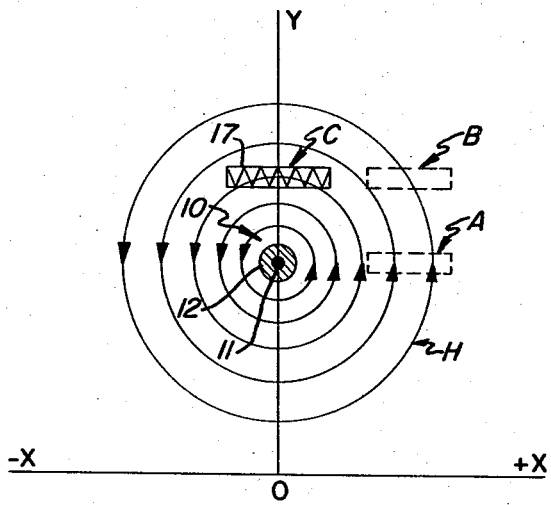
FIGURE 4 is an enlarged diagrammatic sectional view of the conductor and Hall plate showing the relationship of the magnetic field and relative positioning of the Hall plate.

A magnetic field sensing element of the apparatus is adapted to be positioned and supported in predetermined relationship to the cable 10 and to the fixed reference point as the cable moves through the test area. In accordance with this invention, the sensing element comprises a Hall plate 17 which is incorporated in a Hall effect device denoted generally by the numeral 18. The Hall plate 17 is formed from a semi-conductor material as a solid and is preferably of parallelepiped shape. The operation and principles of a Hall effect device are well known and may be generally stated as follows:

"If an electrical current flows uniformly through a solid, and a magnetic field is applied perpendicular to the direction of current flow, then a voltage gradient can be detected in the third direction at right angles to the other two." The current flowing through the solid or Hall plate 17 is referred to herein as the control current $I_c$ and is produced by a direct current power source, such as a battery 19. The battery 19 is appropriately connected to opposed surfaces of the Hall plate 17 by leads 20 and 21 and suitable contacts to cause a current to flow through the plate in one direction. If desired, a resistance may be inserted in lead 20 to limit the current $I_c$. A current flowing through a conductor, the conductor 11 of the cable 10 in this instance, will produce a magnetic field H around the conductor in which the flux lines are concentric to the conductor. The magnetic field H which is produced is diagrammatically illustrated in FIG. 4, by the concentric circles with the directional arrowheads indicating the particular orientation. The Hall plate 17 is positioned in the magnetic field in electromagnetically coupled relationship with the axis or direction of the current $I_c$ flowing through the plate aligned with or parallel to the conductor of the cable.

When thus positioned in the magnetic field H surrounding the cable, a number of flux lines will pass through the Hall plate. The flux lines passing through the Hall plate will be perpendicular to the current flow and will be effective to produce a voltage gradient across two other opposed surfaces and which is perpendicular to the current $I_c$ and magnetic field H.

A second set of contacts with their associated leads 22 and 23 are attached to opposed surfaces of the Hall plate 17 which supply the voltage output thereby defining a voltage axis which is in quadrature to the flow of the current $I_c$. The Hall plate 17 may be positioned in the magnetic field H in such a manner that the flux lines passing through the plate will be at angles other than perpendicular to the Hall voltage output contacts connected to leads 22 and 23. For example, FIG. 4 indicates three possible positions of the Hall plate demonstrating the magnetic field orientation relative to the plate. In position A, the Hall plate is positioned in a plane where the flux lines of the magnetic field H are in quadrature to the voltage axis and would be most effective in producing a Hall voltage. Moving the plate 17 to position B will reduce the Hall voltage as the component of flux in a direction perpendicular to the voltage axis has been reduced. The arcuate flux lines may be resolved into vertical and horizontal vector components with only the vertical components being of effect. Again moving the Hall plate, this time to position C, the effect of the magnetic field H is further reduced as the vertical component of the magnetic flux lines passing through the plate will be minimized. With the vertical component of the magnetic flux thus minimized, a minimum Hall voltage will be produced.

It is this minimum Hall voltage which is utilized in the ascertainment of the position of the current carrying conductor 11. As will be noted from observation of FIG. 4, a minimum Hall voltage will be produced when the Hall plate 17 is arranged with the voltage gradient axis tangential to the arcuate magnetic flux lines and centered relative to a plane defined by the Y-axis which extends through the conductor. In this position, the flux line components in the vertical direction and which pass through the plate will be self-canceling as both positive and negative vertical components of equal magnitude will be present. The result is that with the Hall plate 17 centered over the conductor 11 at the Y-axis, there will be no Hall voltage resulting from the magnetic field H and the conductor may be readily located as also being centered on the Y-axis. Determining the zero Hall voltage as a result of the magnetic field H will permit geometric location of the conductor or, by noting the presence of a Hall voltage, it can be ascertained that the conductor and its field H have been displaced from the Y-axis.

Figure 3:
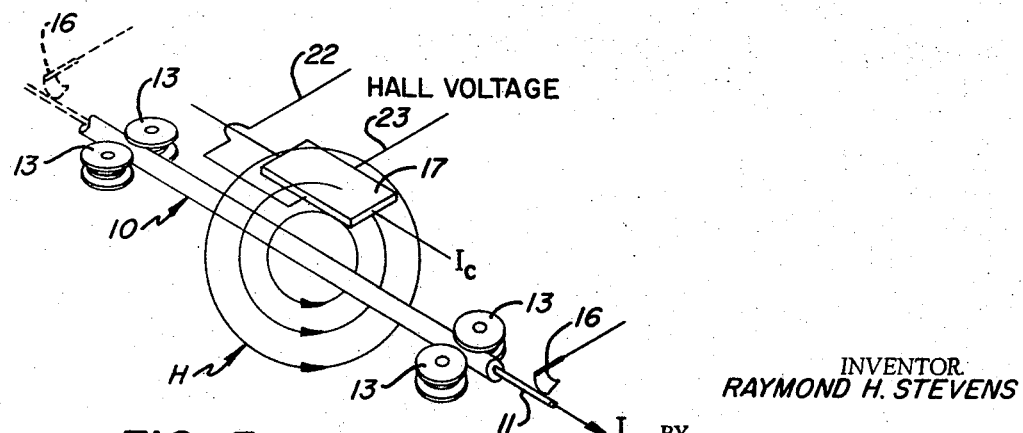
FIGURE 3 is a diagrammatic perspective view of a current carrying conductor and its associated magnetic field showing the positioning of the Hall plate in the field.
Figure 5:
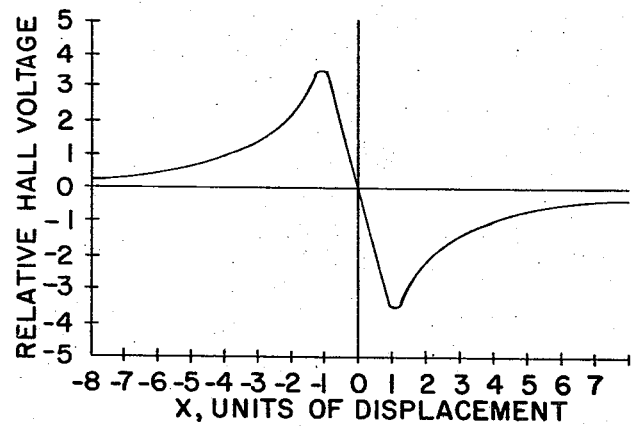
FIGURE 5 is a graphic representation of the output characteristics of the Hall plate as displaced in FIGURE 4.

In the apparatus as diagrammatically illustrated in FIG. 3, the Hall plate is mounted on a support which maintains the plate in fixed predetermined relationship to the portion of the cable 10 which is directed through the test area or to a fixed reference point related to the desired conductor position. The fixed relationship is that the Hall plate will be disposed in a plane parallel to the desired position of the conductor 11 and tangent to a magnetic field of the conductor 11 and will be centered over the predetermined desired center of the conductor. Should the conductor 11 deviate from its desired concentric or otherwise predetermined relationship to the cable covering insulation 12, a corresponding proportional increase in the Hall voltage will be noted. In the illustrated embodiment, the Hall voltage would deviate from 0, either positively or negatively as the conductor would deviate in either a positive or negative X-axis direction, referring to FIG. 4. Deviations in concentricity in the Y-axis direction could not be observed by the Y-axis positioned Hall plate as the Hall voltage is not produced when centered irrespective of the relative spacing. The deviation in Hall voltage as a function of displacement is graphically illustrated by FIG. 5 where there is a relative displacement of the Hall plate from the Y-axis in a plane parallel to the X-axis. The voltage reaches a maximum at a particular unit displacement and thereafter decreases due to the radial displacement from the source of the magnetic field and corresponding decrease in its strength.

With the Hall plate 17 supported in fixed relationship to the reference point, a displacement of the conductor 11 from its desired location will be indicated by the presence of a Hall voltage. Within limits, the Hall voltage thus produced will be a linear function of the displacement and may be utilized to provide an indication of the fact of displacement or, in the case of an automated process, may be utilized to provide or initiate correction of the process. The Hall effect device provides a convenient means of ascertaining the displacement of the conductor which may be readily adapted to a continuous process and provide a continuous indication of the displacement.

There are practical limitations encountered in the application of this method of ascertaining the location of a conductor which would prevent utilization thereof in normal production operations. A single current-carrying conductor will not be capable of creating a large magnetic field, except with a large current which may be destructive, and the Hall effect device in this application is thus limited to low-level operation. As an example of typical operation, a conductor current within the range of 0.1 to 1.0 ampere will produce a Hall voltage of only a few microvolts. In many applications a current of one ampere, or less, is the maximum that the conductor may safely carry. Operation of a Hall effect device at such a low level will be affected by residual outputs such as thermal voltages and Hall output voltages resulting from the earth's field and other extraneous fields.

These unwanted signals are largely eliminated by the apparatus and method of this invention and will have little effect on the indication of the conductor location. The first step in the elimination process is the application of an alternating electric current to the conductor 11. As a consequence, an alternating Hall voltage proportional to the conductor exciting current I is produced and is subsequently amplified by means of an A.C. amplifier 24 which is also powered by the power supply 15. The construction and operation of an A.C. amplifier is well known in the art and is, therefore, not described in further detail. Some of the residual outputs are direct current in character and are accordingly eliminated by the A.C. amplifier 24 and any electronic filters which may also be incorporated in the circuit.

The extraneous A.C. Hall voltages, which would affect the operation of the apparatus, are not eliminated by this first step but are substantially eliminated by the second step in the elimination process. In the second step, the amplified A.C. Hall voltages are fed into a detector or demodulator 25 which is operated in synchronism with the oscillator-power amplifier 14 that is utilized in exciting the conductor 11. The synchronous detector 25 is operative to allow passage of only the A.C. signals which are of the correct frequency and phase. It is for this reason that the selected frequency of operation of the oscillator-power amplifier 14 is substantially dissimilar to other common frequencies. A frequency of 1100 cycles per second is uncommon and also will not be a hormonic of the usual frequencies.

Figure 2:
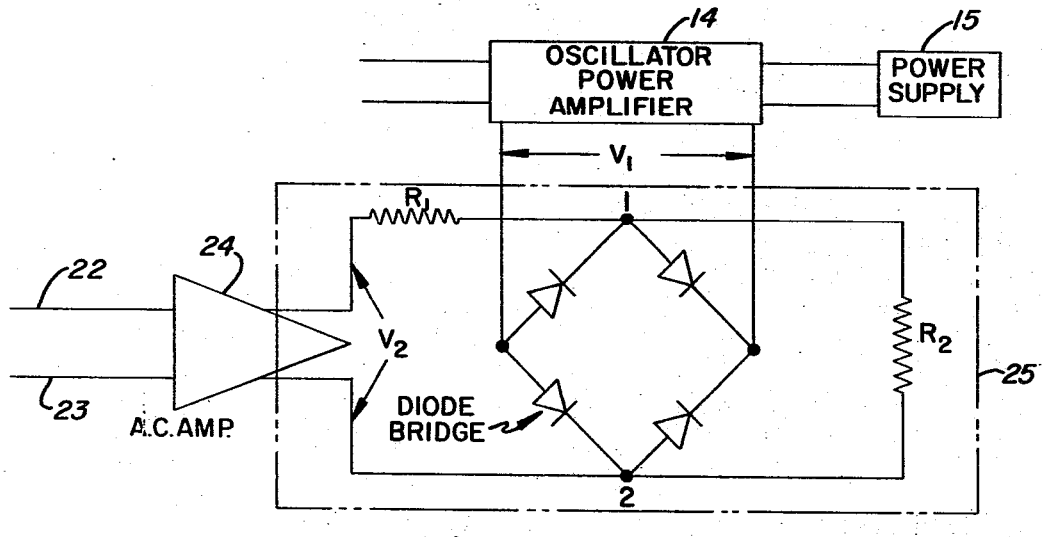
FIGURE 2 is a simplified schematic diagram of the synchronous detector.

A basic circuit for a synchronous detector for utilization with this apparatus is illustrated in FIG. 2. The synchronous detector 25 converts the desired A.C. signal coming out of the amplifier 24 into the D.C. voltage. This is accomplished by a switching action at the output of the amplifier 24 in synchronism with the desired signal, providing half-wave rectification. A detector providing full-wave rectification may also be utilized, if desired. The half-wave synchronous detector comprises a balanced diode bridge connected as shown in FIG. 2. The bridge is connected in such a manner that on one half-cycle of an output voltage V1 of the oscillator-power amplifier the diodes are all conducting. On the other half-cycle of V1 the diodes are all non-conducting. The output voltage V2 of the A.C. amplifier is considerably less than V1, so does not control the diodes. The diode characteristics are chosen so that when conducting they have very little resistance compared to R1 and point 1 will be effectively short-circuited to point 2. The signal voltage V2 will thus appear across the series resistor R1. When the diodes are non-conducting their resistance is very much larger than R1 or R2, so that the signal voltage V2 is divided between R1 and the load, here represented by R2. The desired signal coming through the amplifier is of the same frequency and phase as V1, and so becomes a half-wave rectified voltage across R2 by virtue of the action just described. The average value of this rectified voltage is a D.C. voltage which will operate a meter, recorder, servo-system, etc. All unwanted signals coming through the amplifier are different in frequency or phase from V1, so are not in synchronism with the diode bridge operation, and hence do not appear as a D.C. voltage across the load, but as an A.C. voltage which averages to zero over a period of one or more cycles of V1. Hence the desired signal appears as a D.C. voltage across the load and the undesired signals as A.C., which can be completely eliminated by a low-pass filter, if necessary.

The rectified output of the synchronous detector 25, as has been indicated, may be utilized to operate a suitable readout device, a meter for example, and to operate or drive the servomechanism system incorporated in the processing apparatus. Also, the synchronous detector output may be utilized in controlling various other processing functions for automation of the particular operation.

The specific application heretofore described has been indicated to be capable of only determining displacement along one reference axis. It will be apparent that displacement along more than one axis may be simultaneously ascertained through use of two or more Hall effect devices which are appropriately positioned relative to their respective desired axis. Each Hall effect device would be provided with its own A.C. amplifier and synchronous detector as well as an oscillator-power amplifier operating at a different and distinct frequency. Also, in testing operations for relatively short sections of a cable or device having only one centrally disposed conductor, concentricity could be ascertained by a single Hall effect device through the expedient of rotating the cable or device about the axis of the conductor while maintaining the longitudinal movement. The rotation coupled with proportional longitudinal movement would provide the necessary concentricity information.

Figure 6:
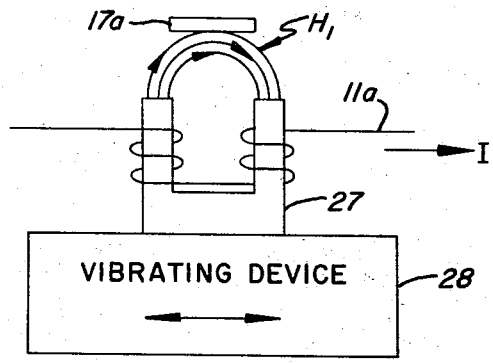
FIGURE 6 is a perspective view of a magnetic field detector apparatus of modified form adapted for utilization as a vibration pick-up.

Although only one specific application of this invention has been fully illustrated and described in detail, it is to be understood that the invention may be readily adapted to other applications. Such other applications may be generally described as a linear transducer, surface finish gaging or as a vibration pickup but the application is not limited thereto. Adaptation of the invention to a vibration detector or pickup is diagrammatically illustrated in FIG. 6. The current carrying conductor 11a in this application becomes an integral part of the transducer and may be wound a number of times on a core 27 of suitable magnetic material having an air gap to produce the necessary arcuate magnetic flux lines. The Hall plate 17a would again be supported in a fixed position but the magnetic core would be attached to the device 28 which may be subjected to vibration in a direction as indicated. Vibration in this direction would cause movement of the magnetic field from a predetermined reference point relative to the Hall plate 17a and thereby produce a Hall voltage.

It is readily apparent that the conductor or magnetic field locating apparatus of this invention provides a convenient and highly accurate means of determining the location or displacement of a magnetic field producing device relative to a fixed reference point. The location or displacement will be readily indicated by the Hall voltage thus produced. The method of exciting the conductor with an alternating current to produce an A.C. Hall voltage signal and subsequently amplifying and then detecting the desired signal in synchronism with the conductor exciting current substantially eliminates all residual or extraneous signals which could adversely affect the operation.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. apparatus for determining displacement of a device formed with electric current conducting means relative to a fixed reference point comprising an alternating-current-waveform electric power source connected with the current conducting means of the device for inducing current flow therethrough to produce an alternating-current-waveform magnetic field of a predetermined frequency and having an arcuate magnetic field component spatially fixed relative to the device said device being initially positioned at said fixed reference point, and a Hall-effect device disposed in fixed relationship to said fixed reference point and electromagnetically coupled with the magnetic field and being operated to produce a Hall-voltage output signal of alternating current waveform at the predetermined frequency and which signal is related to the magnetic field, said Hall-effect device being positioned with the magnetic axis thereof perpendicular to said arcuate magnetic field component when the device is at said fixed reference point to provide a zero output signal when the device is at said fixed reference point and a polarized-voltage output signal when the device is displaced from said fixed reference point.

2. Apparatus according to claim 1 which includes a voltage signal amplifier connected to the output of said Hall-effect device and responsive only to voltage signals of alternating current waveform to provide an output having only voltage signals of alternating current waveform.

3. Apparatus according to claim 1 which includes a synchronous detector connected in circuit with said power source and said Hall-effect device to receive the Hall-voltage output signal, said synchronous detector having an output and being operable to eliminate from said output voltage signal components of a frequency other than said predetermined frequency.

4. The method of ascertaining displacement of a device relative to a fixed reference point consisting of producing a magnetic field of alternating current waveform at a predetermined frequency and having an arcuate field component spatially related to the device said device being initially positioned at said fixed reference point, detecting the magnetic field by a Hall-effect device disposed in fixed relationship to the reference point and in electromagnetically coupled relationship with the arcuate magnetic field component to produce a Hall voltage signal of alternating current waveform at the predetermined frequency related to the displacement of the device only when the device is displaced relative to the fixed reference point, amplifying the Hall voltage signal by a voltage signal amplifier responsive only to signals of alternating current waveform thereby eliminating extraneous voltage signals of direct current waveform, and detecting the voltage signal from the amplifier by a synchronous detector operating in phase with the magnetic field at the predetermined frequency to eliminate all alternating current waveform signal components of a frequency other than the predetermined frequency of the magnetic field and thereby provide an output signal of direct current waveform related to the displacement of the device when the device is displaced relative to the reference point.

References Cited

UNITED STATES PATENTS

| 1,998,952 | 4/1935 | Edgar et al. | 324—45 |
| 2,779,916 | 1/1957 | Poole | 324—34 |
| 3,060,370 | 10/1962 | Varterasian | 324—45 |

FOREIGN PATENTS

| 984,762 | 7/1951 | France. |
| 574,618 | 1/1946 | Great Britain. |

OTHER REFERENCES

McMasters, R. C.: Non-Destructive Testing Handbook, New York, Ronald Press, 1963, vol. 2, pp. 34.18 to 34.19.

RUDOLPH V. ROLINEC, *Primary Examiner.*

R. J. CORCORAN, *Assistant Examiner.*